United States Patent

[11] 3,587,914

| [72] | Inventors | Geoffrey Charles Jennings Brewood; Ronald Leslie Grosvenor, Codsall, England |
|---|---|---|
| [21] | Appl. No. | 731,825 |
| [22] | Filed | May 24, 1968 |
| [45] | Patented | June 28, 1971 |
| [73] | Assignee | Marston Excelsior Limited Wolverhampton, England |
| [32] | Priority | May 26, 1967 |
| [33] | | Great Britain |
| [31] | | 24662/67 |

[54] SELF SEALING UNITS FOR FUEL CELLS
4 Claims, 6 Drawing Figs.

[52] U.S. Cl. .................................................. 220/63, 161/161, 161/405
[51] Int. Cl. ........................................................ B65d 25/14
[50] Field of Search............................................220/63 (A), 9 (X); 150/.5; 161/160, 161, 404, 405

[56] References Cited
UNITED STATES PATENTS

| 2,404,418 | 7/1947 | Walker....................... | 220/63-A |
| 2,407,515 | 9/1946 | Roberts...................... | 220/63-A |
| 2,601,525 | 6/1952 | Howald et al................ | 220/63-A |
| 2,715,085 | 8/1955 | Boger......................... | 220/63-A |
| 2,754,992 | 7/1956 | Wilson....................... | 220/63-A |
| 2,900,289 | 8/1959 | Harlan........................ | 220/63-A-X |

FOREIGN PATENTS

| 509,043 | 7/1939 | Great Britain................ | 220/63-A |

*Primary Examiner*—Raphael H. Schwartz
*Attorney*—Cushman, Darby and Cushman

ABSTRACT: A vehicle comprises a fuel cell defined by vehicle frame structure members, at least some of the inner surfaces of the cell having self-sealing units bonded thereto.

SELF SEALING UNITS FOR FUEL CELLS

BACKGROUND OF THE INVENTION

Field of the Invention

This invention relates to vehicle fuel cells and self-sealing units therefor.

SUMMARY OF THE INVENTION

According to the invention a vehicle has a fuel cell defined by vehicle frame structure members, a surface bordering the fuel cell of one at least of said members having a self-sealing unit extending across and being bonded thereto.

Preferably, the self-sealing unit comprises a layer of a first material which expands when in contact with hydrocarbon fuels, the layer of material being sandwiched between two coatings or layers of a second material which is impermeable to the fuel.

The invention also includes a self-sealing unit for a vehicle fuel cell comprising a layer of a first material which expands when in contact with hydrocarbon fuels, the layer of material being sandwiched between two coatings or layers of a second material which is impermeable to the fuel, said coatings or layers of second material extending around edges of the first material layer so as completely to enclose it.

The vehicle according to the invention may be a combat vehicle such as an aircraft which may have fuel cells in its wings. Other combat vehicles according to the invention may, for instance, be ships, air cushion vehicles and land and amphibious vehicles.

BRIEF DESCRIPTION OF THE DRAWINGS

In order to explain the invention more clearly, one embodiment will now be more particularly described with reference to the accompanying drawings in which.

DESCRIPTION OF THE PREFERRED EMBODIMENT

Figure 1:
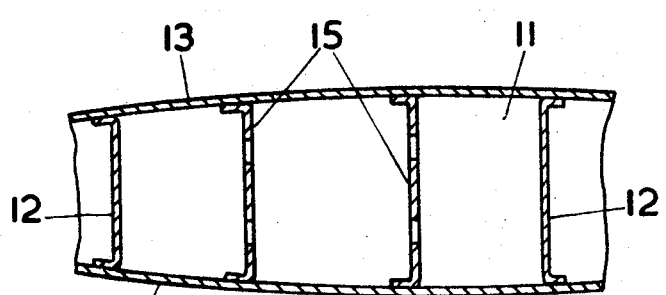
FIG. 1 is a longitudinal diagrammatic section of part of an aircraft wing in which a fuel cell is incorporated.

Referring to FIG. 1 of the drawings, in an aircraft wing 10 a fuel cell is defined between a leading edge skin 11, a rear spar member (not shown), two bordering ribs 12 extending between the leading edge skin and the spar member, and by upper and lower skin panels of the wing 13, 14, respectively. Between the two bordering ribs 12, intermediate ribs 15 and stringers 16 are located, the intermediate ribs being formed with flanged holes to allow for free flow of fuel from end to end of the cell between the bordering ribs.

The fuel cell is made into a self-sealing cell by the addition of self-sealing units denoted by numeral 17 in FIGS. 2 to 6 and which are adhered in close contact with the inner cell bordering surfaces of the leading edge skin, rear spar member and with the lower skin panel 14 and by self-sealing units adhered to cell bordering surfaces of the two bordering ribs 12. Each unit completely covers and is secured over substantially the whole of one of its surfaces to its associated bordering surface. For instance, each unit 17 on the skin panel 14 covers a complete surface uninterrupted by stringers 16 although this surface is a part only of the whole inner surface of the panel. With the panel 14, the whole of its inner surface lying between stringers and ribs is covered by units 17 (see particularly FIG. 2).

Figure 6:
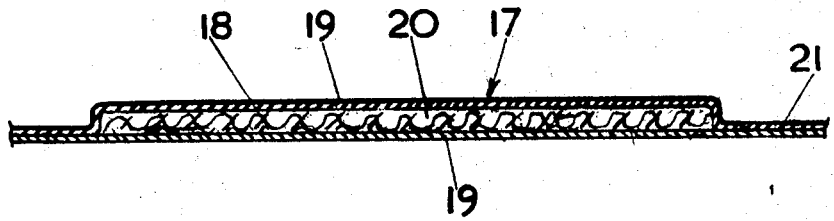
FIG. 6 is a cross section along line VI-VI of FIG. 5.

Referring to FIG. 6, each self-sealing unit 17 is made from a layer 18 of foam cellular natural rubber which is sandwiched between two adhering impermeable layers 19 of nitrile rubber. Other impermeable materials which may be used for this purpose are, for instance, nylon or polyurethane films. On one side of the nitrile rubber sandwiched foam layer which is to face inwardly of the cell, there is located a fabric layer 20 which may be made from woven nylon, polyester or glass cords or filaments. Alternatively, the fabric layer may be of natural textile material coated with or embedded in nitrile rubber. It is clear from FIG. 6 that end surfaces of the foam rubber layer are also sealed by the layers 19 of nitrile rubber so that the foam rubber layer is completely enclosed. Marginal portions 21 of layers 19 and 20 extend beyond the foam rubber and are bonded together by suitable adhesive.

Figure 2:
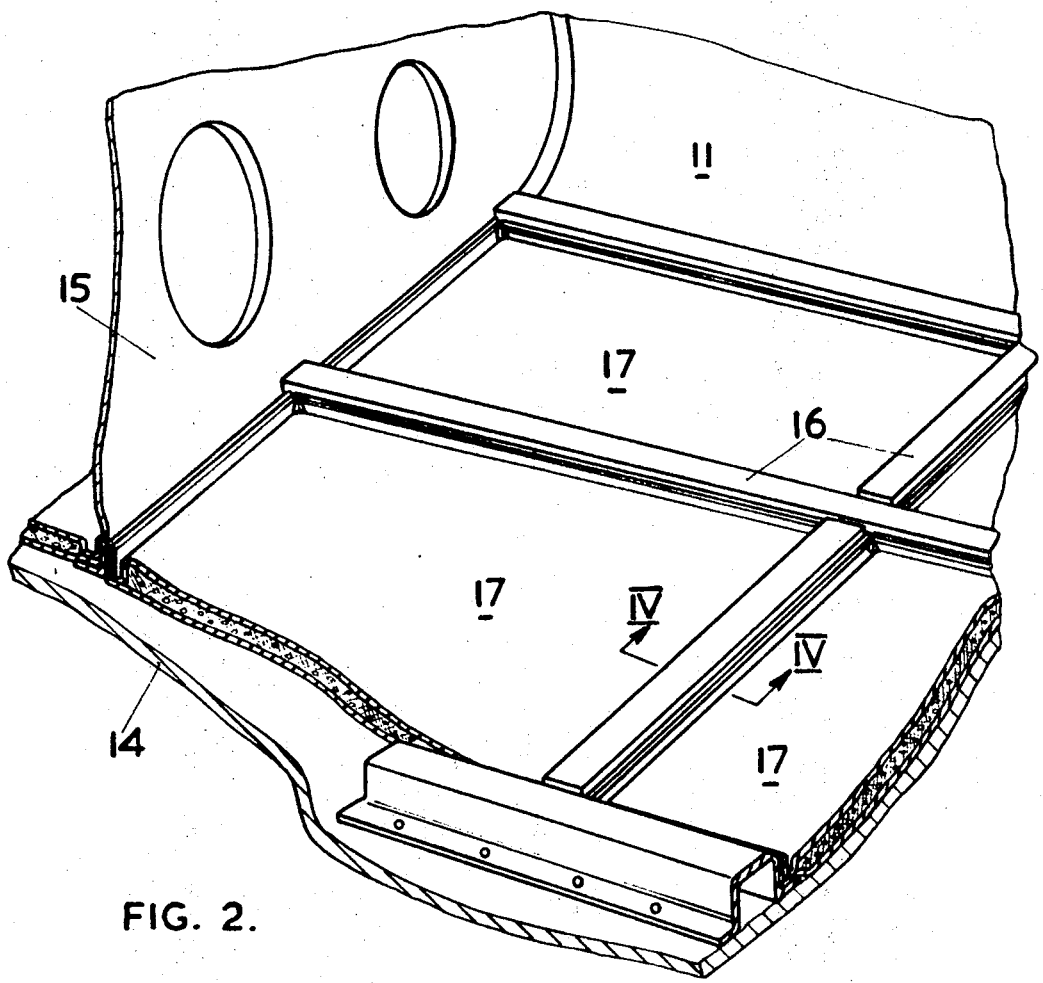
FIG. 2 is a perspective view, on a larger scale than FIG. 1, of part of the fuel cell in the aircraft wing.
Figure 3:
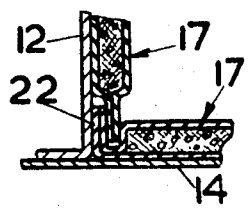
FIG. 3 is a fragmentary sectional view at one end of the fuel cell.

The self-sealing units are secured to the appropriate surfaces of the frame members and skin panels by an adhering agent which should, preferably, be a fuel resistant agent such as, for instance, a cold cure cement including a nitrile rubber base. FIG. 3 illustrates a convenient method of connecting self-sealing units at the ends of the fuel cell where the bordering ribs 12 are connected to the lower skin panel 14. A unit 17 is bonded to a bordering rib 12 and an adjacent unit 17 is bonded to the lower skin panel 14 in such positions that a marginal portion of the unit on the skin panel is formed into a U-shaped lip 22, disposed against the inner surface of rib 12. The marginal portion of the other unit 17 extends over the lip and is sealed thereto.

Figure 4:
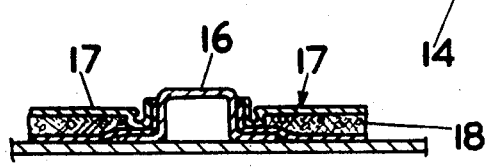
FIG. 4 is a fragmentary sectional view taken along line IV-IV in FIG. 2.
Figure 5:
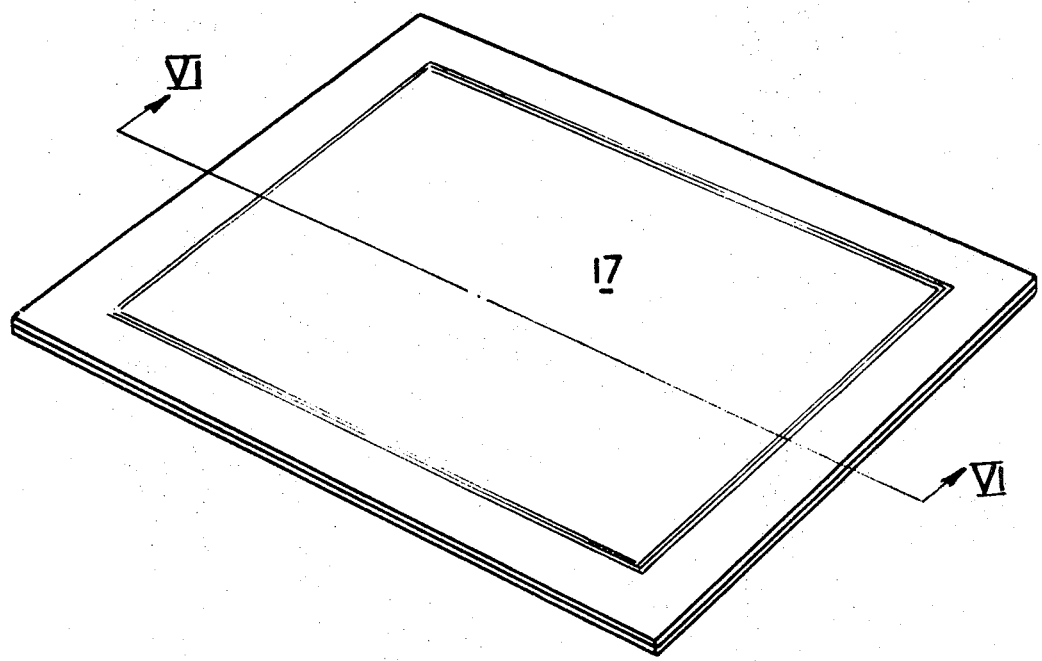
FIG. 5 is a perspective view of a self-sealing unit.

FIG. 4 illustrates the arrangement of the self-sealing units where they are in contact with the stringers 16 which have a top hat section. The marginal portions are formed into a U-shaped lip and are disposed against legs of the inverted channel portion of the stringers so that the foam rubber layers 18 can extend as close as possible to the legs.

By virtue of the arrangements illustrated in FIGS. 3 and 4, substantially all of the inner, lower and side bordering surfaces of the fuel cell are covered by foam rubber 18 of self-sealing units 17.

In use of the self-sealing cell, the nitrile rubber layers remote from the frame members and skin panels normally prevent fuel from reaching and affecting the foam rubber layers. Similarly, should there be any leakage of fuel between the frame members or skin panels and the self-sealing units, the nitrile rubber layers on the other sides of the foam rubber layers prevent fuel reaching the foam rubber.

In the event that a missile passes through the cell and penetrates one of the self-sealing units, immediately fuel commences to escape, it contacts the foam rubber and causes it to swell thereby substantially sealing any hole in the unit made by the missile. Leakage of fuel is thereby either stopped or is reduced significantly. The fabric layers on the unit prevent the foam rubber layer from swelling outwardly from the unit so that any expansion of the rubber is generally confined between the surfaces of the unit thereby ensuring the closing of the hole.

In this embodiment, no self-sealing units have been included against the upper skin panel as any hole in this panel would not result in escape of fuel with the aircraft in level flight. However, should it be preferred, self-sealing units may also be provided for the upper skin panel.

In conventional aircraft design in which self-sealing fuel cells have been used, the aircraft are sometimes designed to allow space for the cells to be located between framework members. This has clearly meant that framework members have been spaced further apart than would otherwise have been necessary for ordinary design considerations to obtain the required rigidity and strength of the aircraft. Design requirements have, therefore, led to stiffer and heavier framework members surrounding the cells than would otherwise have been required thereby resulting in increase in aircraft weight.

Because of the use of self-sealing units according to the invention, however, positions of framework members are not dependent upon sizes of self-sealing cells to be located within the framework. In contrast, the framework members may be located in positions dictated solely by design requirements to give the necessary rigidity and strength to the aircraft framework while allowing the weight to be at the minimum possible dependent upon strength requirements.

Furthermore, in conventional aircraft, the self-sealing cells are prefabricated flexible containers which are simply located within the framework. To provide the storage space for fuel equal to that provided by conventional containers, the self-sealing units used as described above may have less total weight than the conventional containers because they do not themselves form a continuous container.

We claim:

1. A vehicle having vehicle frame structure members, some of said members defining a fuel cell and having surfaces bordering the fuel cell including a base of the cell, and a plurality of self-sealing units, one of the units covering and being bonded to the surface forming the base of the fuel cell and the other self-sealing units covering and being bonded to other surfaces bordering the fuel cell and wherein the self-sealing units each comprise a layer of a first material which expands when in contact with hydrocarbon fuels and two layers of a second material which is impermeable to the fuel, the layer of first material being sandwiched between the layers of second material.

2. A vehicle having vehicle frame structure members, some of said members defining a fuel cell and having surfaces bordering the fuel cell including a base of the cell, and a plurality of self-sealing units, one of the units covering and being bonded to the surface forming the base of the fuel cell and the other self-sealing units covering and being bonded to other surfaces bordering the fuel cell, the self-sealing units each comprising a layer of a first material which expands when in contact with hydrocarbon fuels, and two layers of a second material which is impermeable to the fuel, the layer of first material being sandwiched between the layers of second material, and the layers of second material extending around edges of the layer of first material so as completely to enclose it.

3. A vehicle having vehicle frame structure members, some of said members defining a fuel cell and having surfaces bordering the fuel cell including a base of the cell, and a plurality of self-sealing units, one of the units covering and being bonded to the surface forming the base of the fuel cell and the other self-sealing units covering and being bonded to other surfaces bordering the fuel cell, each self-sealing unit having a marginal portion, with marginal portions of adjacent self-sealing units being sealed together.

4. A vehicle according to claim 3 wherein the marginal portions of each self-sealing unit are thinner than the remainder of the unit and marginal portions of adjacent units are sealed together in overlapping relationship.